(12) United States Patent
Wanni

(10) Patent No.: US 10,844,830 B1
(45) Date of Patent: Nov. 24, 2020

(54) WAVE ENERGY CONVERTER

(71) Applicant: Amar S. Wanni, Fairfax, VA (US)

(72) Inventor: Amar S. Wanni, Fairfax, VA (US)

( * ) Notice: Subject to any disclaimer, the term of this patent is extended or adjusted under 35 U.S.C. 154(b) by 0 days.

(21) Appl. No.: 16/714,715

(22) Filed: Dec. 14, 2019

(51) Int. Cl.
  *F03B 13/14* (2006.01)
  *E02B 9/08* (2006.01)

(52) U.S. Cl.
  CPC .............. *F03B 13/148* (2013.01); *E02B 9/08* (2013.01)

(58) Field of Classification Search
  CPC ...... F03B 13/14; F03B 13/141; F03B 13/142; F03B 13/148; E02B 9/08
  See application file for complete search history.

(56) References Cited

U.S. PATENT DOCUMENTS

| | | |
|---|---|---|
| 4,495,765 A | 1/1985 | French |
| 5,355,674 A | 10/1994 | Rosenberg |
| 5,909,060 A | 6/1999 | Gardner |
| 5,955,790 A | 9/1999 | North |
| 6,291,904 B1 | 9/2001 | Carroll |
| 6,731,019 B2 | 5/2004 | Burns et al. |
| 7,768,144 B2 | 8/2010 | North et al. |
| 8,215,270 B2 | 7/2012 | McKaig et al. |
| 8,912,677 B2 | 12/2014 | Dehlsen et al. |
| 9,458,819 B2 | 10/2016 | Wanni |
| 2003/0001392 A1 | 1/2003 | Gerber et al. |
| 2005/0066654 A1 | 3/2005 | Koivusaari |
| 2008/0050178 A1 | 2/2008 | Erlingsson |
| 2015/0275849 A1* | 10/2015 | Sieber ................. F03B 13/1875 60/327 |
| 2016/0252070 A1* | 9/2016 | Wanni ................... F03B 13/148 60/497 |

* cited by examiner

*Primary Examiner* — Sean Gugger
(74) *Attorney, Agent, or Firm* — Louis Ventre, Jr.

(57) ABSTRACT

A wave energy converter situated on a seabed includes a pair of pistons, a means for producing energy within a vessel, and a water-conveyance pipe attached to the vessel. The pistons reciprocate using differential pressure to extract energy from a wave transiting on the surface of a body of water. Water receiving ports at high and low pressure points create a differential pressure to act on the pistons and push them in opposite directions. A hydraulic cylinder or a linear alternator is attached between the pair of pistons to extract the energy.

17 Claims, 14 Drawing Sheets

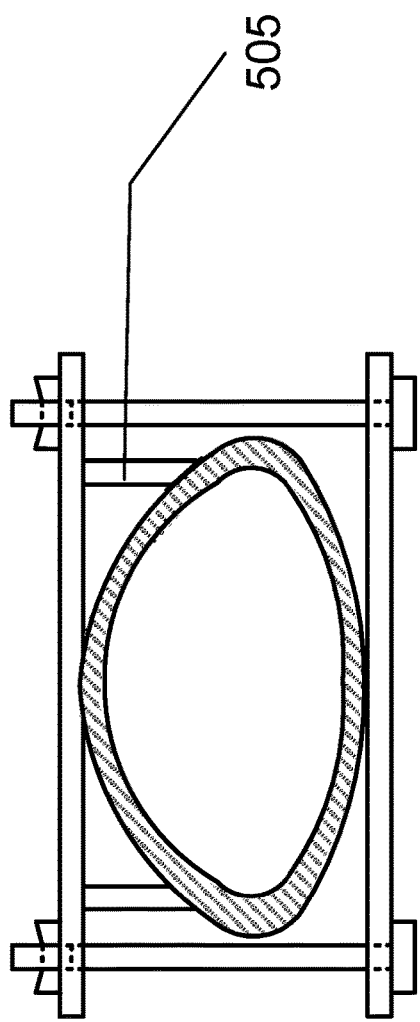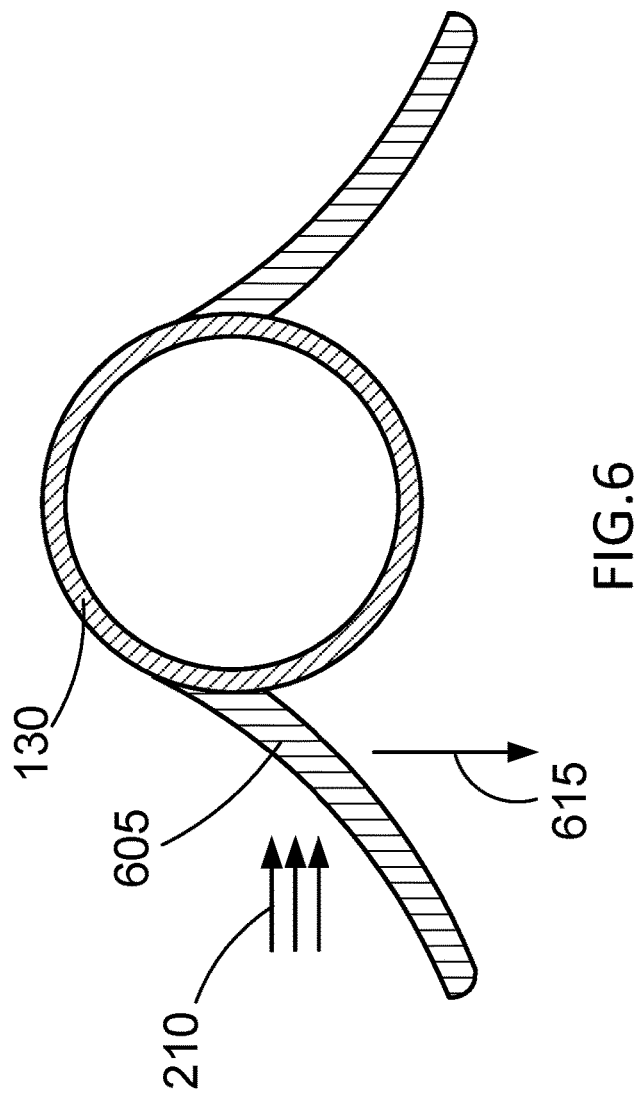
FIG.5
FIG.6

WAVE ENERGY CONVERTER

TECHNICAL FIELD

In the field of extracting energy from ocean waves, a seabed-mounted wave energy converter uses differential pressure acting on a pair of pistons configured to move in opposite directions within a vessel to extract energy from a wave transiting on the surface of a body of water.

BACKGROUND ART

This is a second-generation wave energy converter making improvements over a first-generation wave energy converter that was first patented by the present inventor in U.S. Pat. No. 9,458,819, which is hereby incorporated by reference herein. In the previous, first-generation wave energy converter, a seabed-mounted wave energy converter uses differential pressure acting on opposing faces of a single piston to extract energy from a wave transiting on the surface of a body of water. It operates by pressurizing hydraulic fluid below the surface water level and below a location of transiting waves. The pressurized hydraulic fluid may be utilized to produce electricity or for other purposes.

Improvements have been made to the first-generation wave energy converter to greatly reduce inertial forces acting during the operation of the wave energy converter stemming from the motion of a single piston. The second-generation improvements eliminate the single reciprocating piston and replace it with a new design using a pair of pistons moving in opposing directions so that inertial forces are canceled out. Opposing piston motion is attained by strategic placement of water input and output ports. Other improvements involve: the potential utilization of a linear alternator as a substitute for the hydraulic cylinder; valves and shunts to turn off power production; ramps to add downward force stability on the sited converter; and an internal wall that isolates piston travel paths from dents in the outer shell.

SUMMARY OF INVENTION

A wave energy converter situated on a seabed includes a pair of pistons, a means for producing energy within a vessel, and a water-conveyance pipe attached to the vessel. The pistons reciprocate using differential pressure to extract energy from a wave transiting on the surface of a body of water. The vessel has one or more water receiving ports that permit a flow of water into and out of the vessel. The differential pressure pushes each piston in the pair of pistons in opposite directions. The means for producing energy, such as a hydraulic cylinder and a linear alternator, is attached between the pair of pistons. The water-conveyance pipe connected to the vessel in a configuration that inhibits flow of water into the vessel when the means for producing energy is at the maximum dimension. The water-conveyance pipe defines a downstream aperture configured to enable flow of water into and out of the water-conveyance pipe. The downstream aperture is positioned so that the downstream aperture is at a point of lower pressure when the vessel is at a point of higher pressure.

Optionally, a guide is secured within the vessel to permit the pair of pistons to follow a defined path. The guide is mated to a sliding surface on each of the pistons. Stops on the guide may be used to limit the travel of the pistons. Preferably, the pistons are neutrally buoyant to eliminate unwanted forces on the pistons and bearing surfaces. An equalization valve may be used with any hydraulic cylinder to deactivate the hydraulic cylinder. Similarly a shunt may be used to ground out any electricity produced by the linear alternator. When more than one hydraulic cylinder is used, they may be activated or deactivated based on the differential pressure acting on the pistons.

Ramps may be added to the wave energy converter to create downward forces on the wave energy converter to hold it in place. Optionally, an inner wall within the vessel serves to isolate the pistons from dents in the vessel outer wall or from cyclic pressure variations that would otherwise occur on the outer wall thereby leading to cyclic deformations.

For a simpler installation, the wave energy converter may be configured as a single pipe with an upstream aperture, a downstream aperture and a water receiving port. The pair of pistons is located within the pipe straddling the water receiving port.

Technical Problem

The first-generation wave energy converter generated substantial inertial loads from a reciprocating single piston. These loads were transmitted into a steel structure that had to be rigorously restrained to the seabed.

Subsurface currents and component buoyancy can create unwanted forces against the wave energy converter and cause unwanted displacement of the wave energy converter.

Certain maintenance and operational preferences require an ability to remotely turn off energy production from the wave energy converter and to provide uniform loading on the surface of one or more pistons.

Handling and Installation damage, such as dents to the outside of wave energy converter, can cause operational failures.

Solution to Problem

The solution is using a pair of pistons moving in opposing directions so that inertial forces are canceled out. Opposing piston motion is attained by strategic placement of water input and output ports. Other improvements involve: the potential utilization of a linear alternator as a substitute for the hydraulic cylinder; a piston guide and sliding interface; valves and shunts to turn off power production; ramps to add downward force stability on the sited converter; and an internal wall that isolates piston travel paths from dents and cyclic deformations in the outer shell.

Advantageous Effects of Invention

The improved design reduces the need for a sturdy support structure embedded into the seabed for the wave energy converter. Inertial forces from piston movement are virtually eliminated. Downward force vectors from ramps and/or a shaped pipe also optionally minimize forces leading to movement or damage to the wave energy converter from transient water currents.

BRIEF DESCRIPTION OF DRAWINGS

The drawings illustrate preferred embodiments of the wave energy converter according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 5 illustrates a water-conveyance pipe in the shape of a ramp that deprives water flow across the lower portion of the pipe thereby creating a downward force vector.

FIG. 6 illustrates the use of ramps on the sides of a circular cross-section of the water-conveyance pipe to create a downward force vector on the water-conveyance pipe from water flowing over the water-conveyance pipe.

DESCRIPTION OF EMBODIMENTS

In the following description, reference is made to the accompanying drawings, which form a part hereof and which illustrate several embodiments of the wave energy converter. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
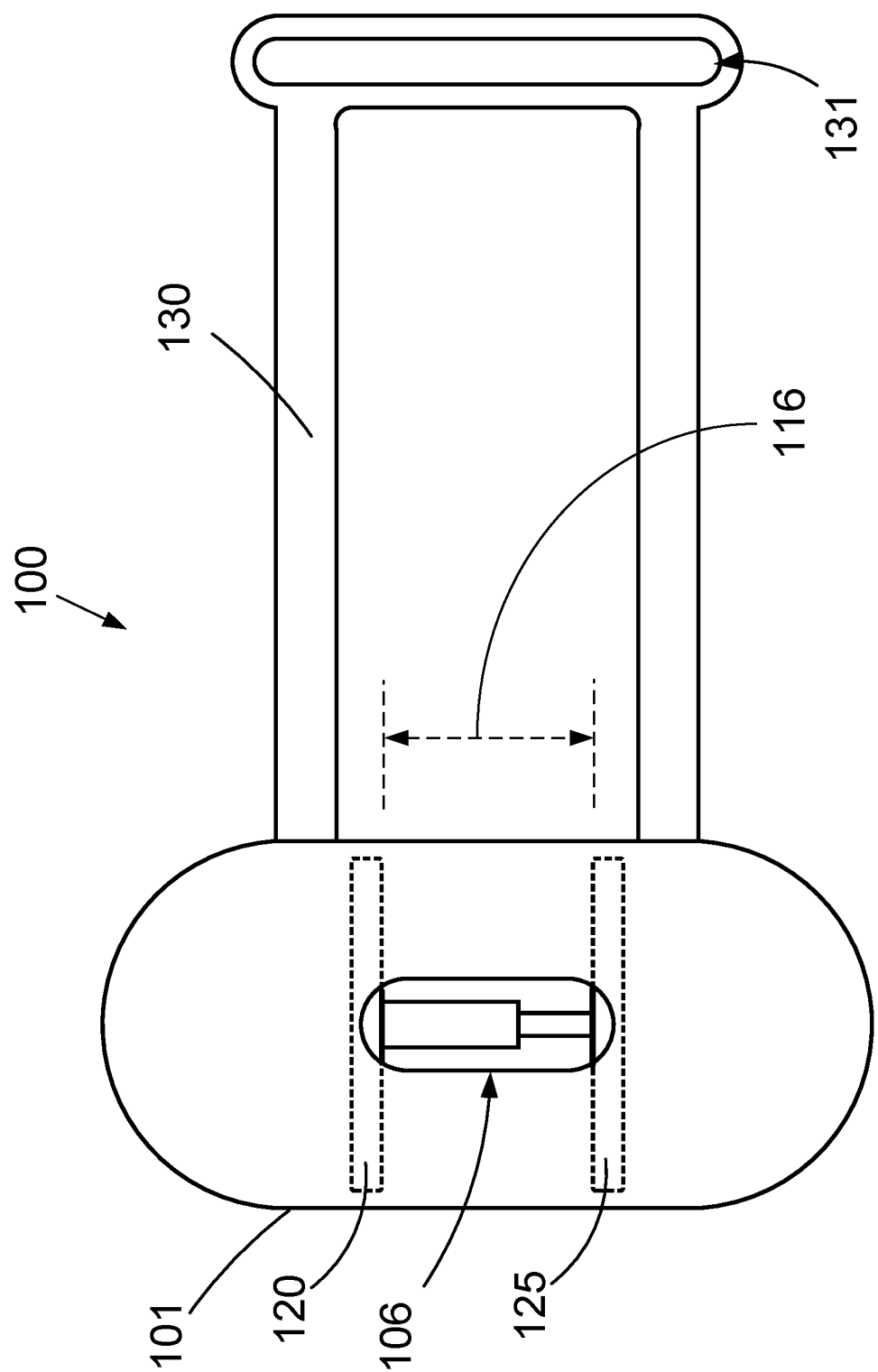
FIG. 1 is a plan view of a first preferred embodiment of the wave energy converter showing a vessel connected to a water-conveyance pipe.

A first preferred embodiment of the wave energy converter (100) is illustrated in a plan view shown in FIG. 1.

Figure 2:
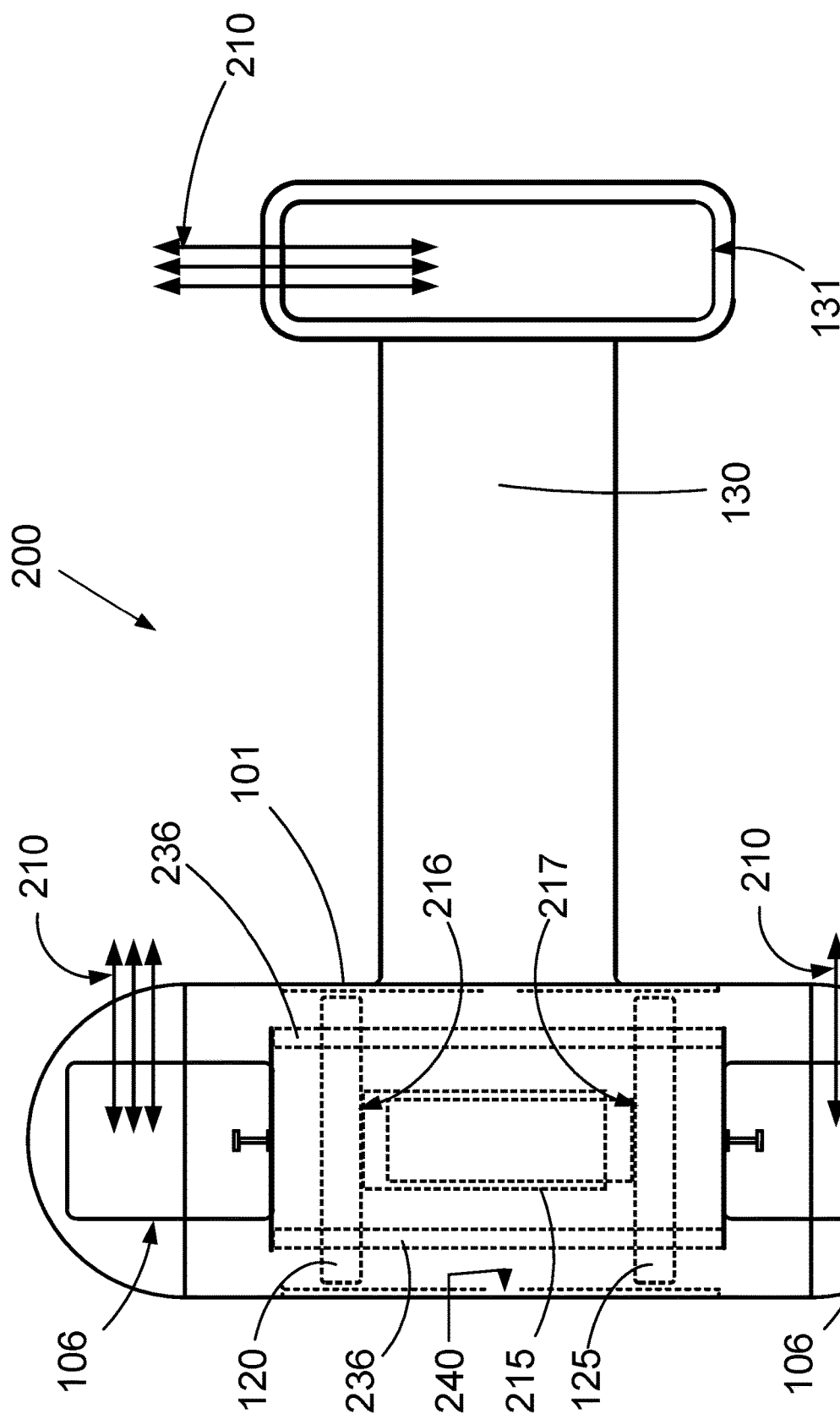
FIG. 2 is a plan view of a second preferred embodiment of the wave energy converter showing the vessel connected to the water-conveyance pipe.
Figure 3:
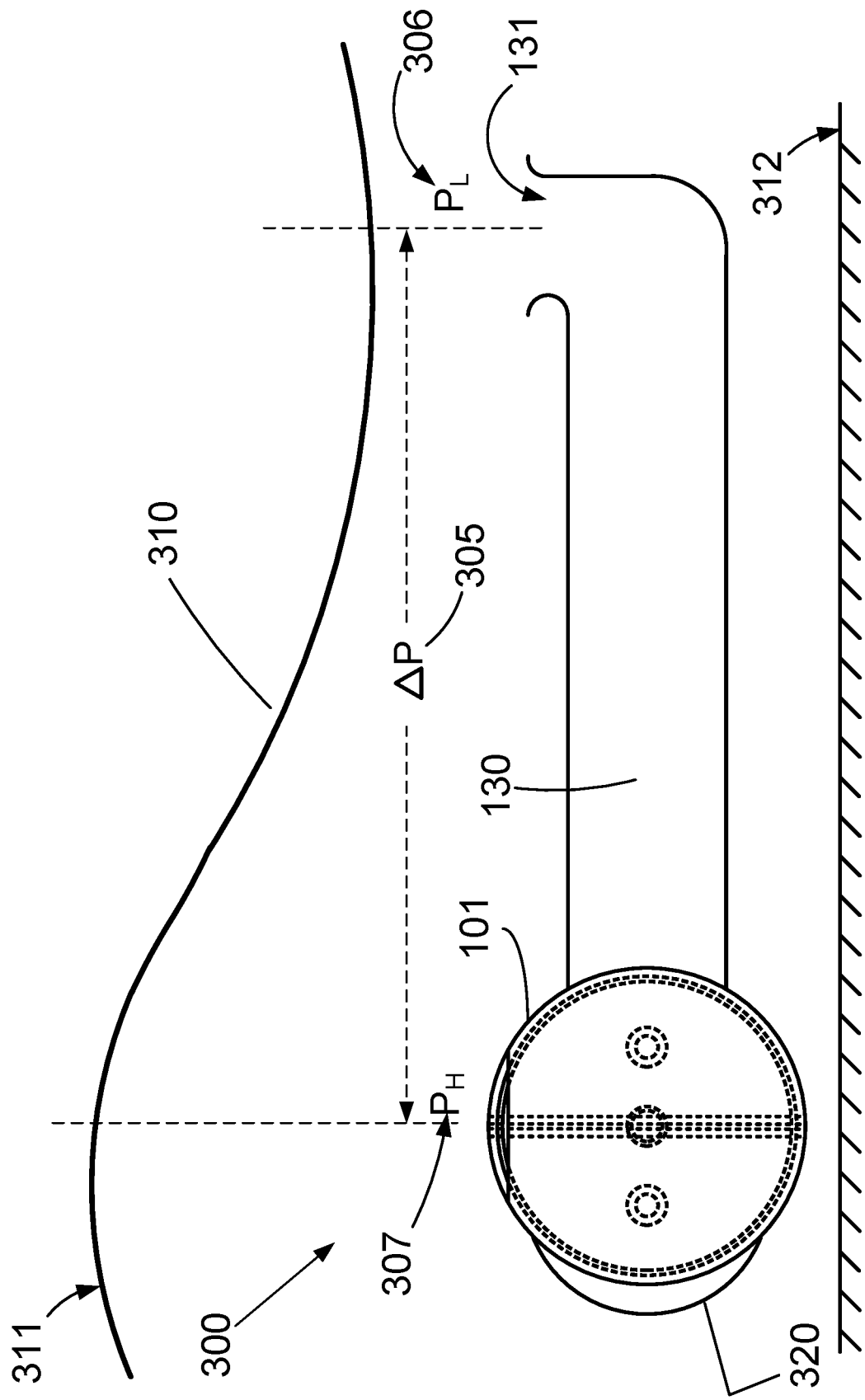
FIG. 3 is a side elevation view of the second preferred embodiment of the wave energy converter showing an added rib for structural reinforcement and further showing the vessel connected to the water-conveyance pipe in the context of a seabed installation below a wave.
Figure 13:
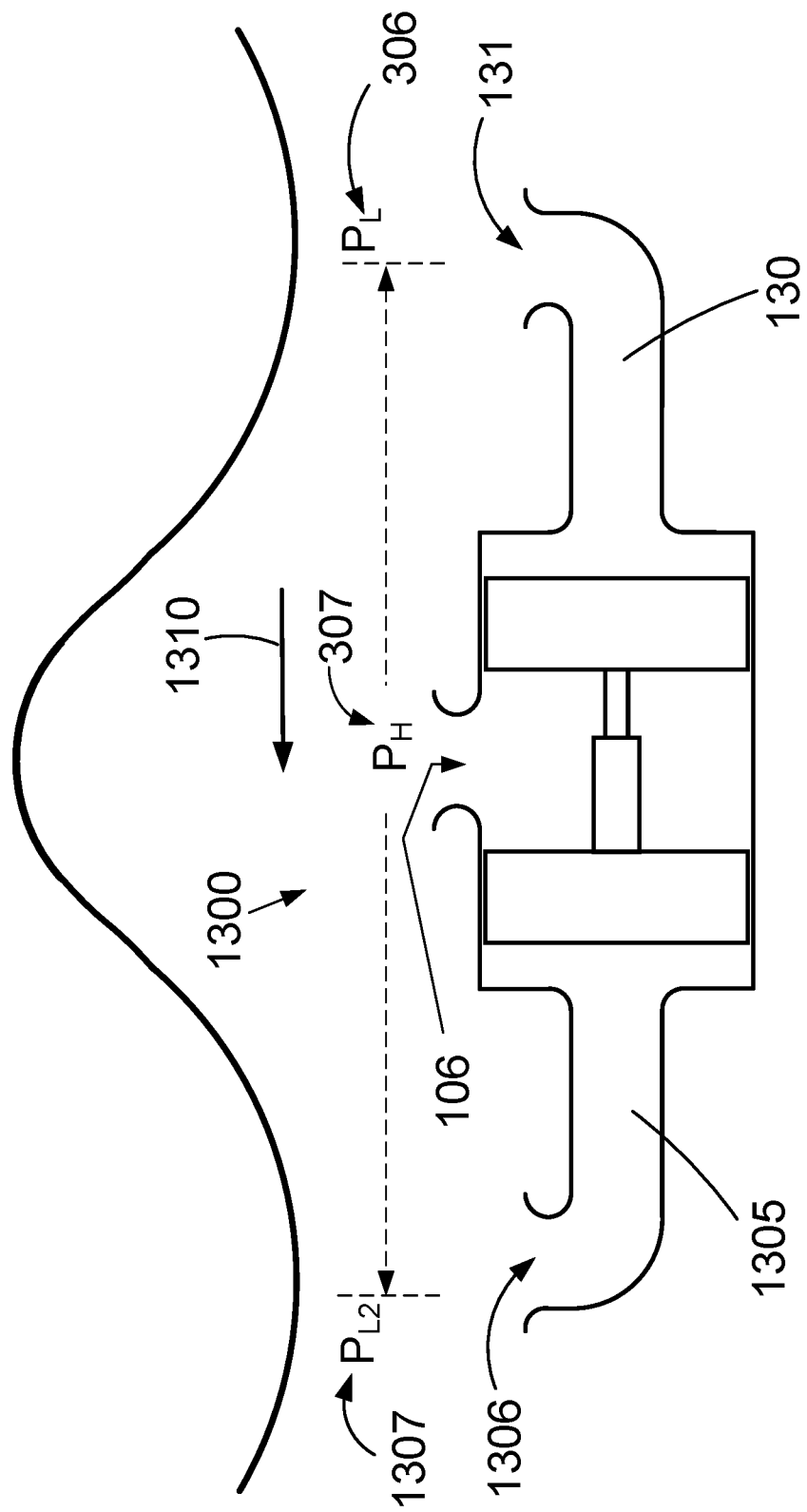
FIG. 13 is a side elevation view of a third embodiment of the wave energy converter in a single pipe with a high-pressure aperture located below mid-stream of a wave and two low pressure apertures, one upstream and one downstream.
Figure 14:
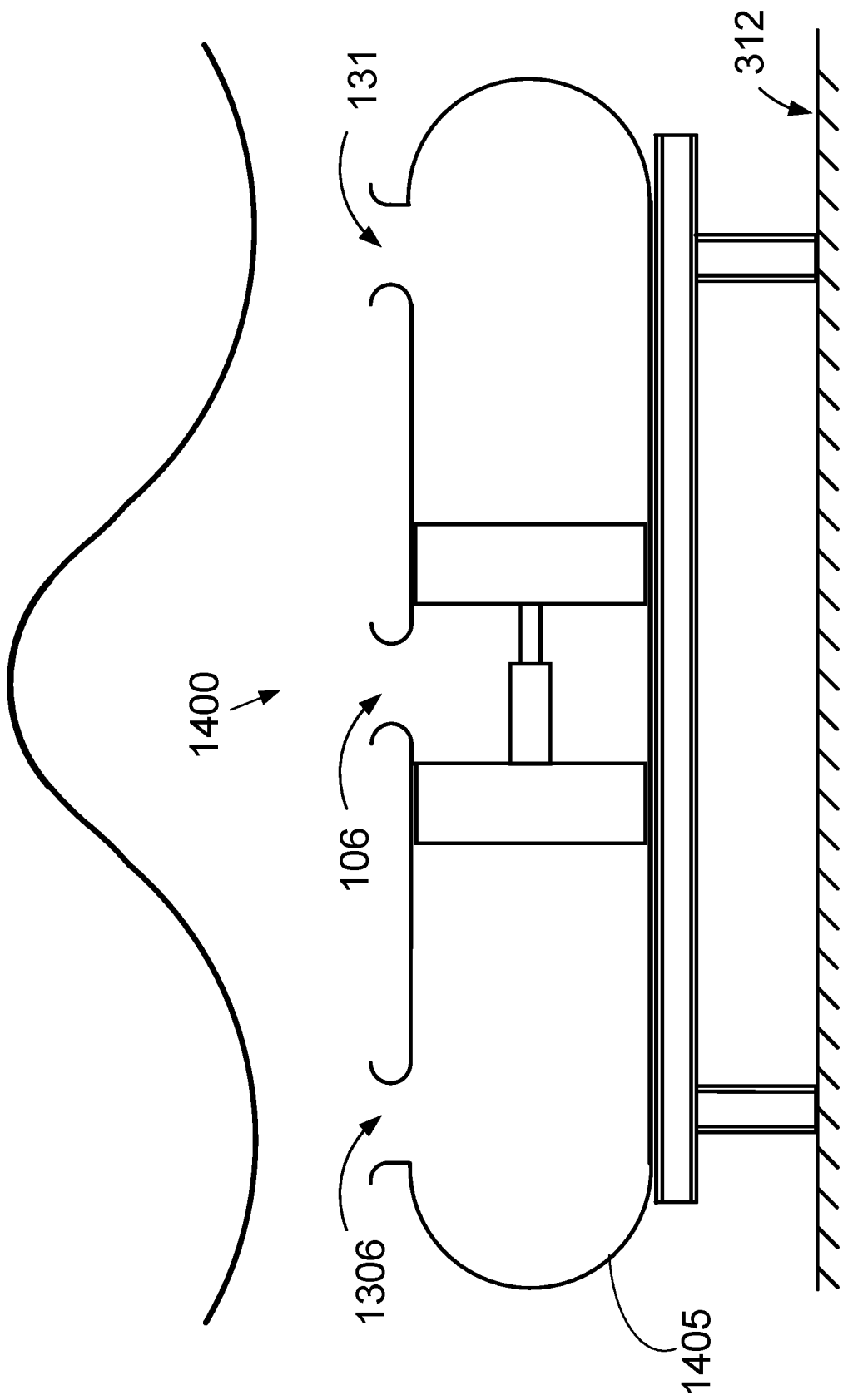
FIG. 14 is similar to FIG. 13 except that the pipe is made more uniform with no central box-like vessel. It is a fourth embodiment of the wave energy converter.
Figure 15:
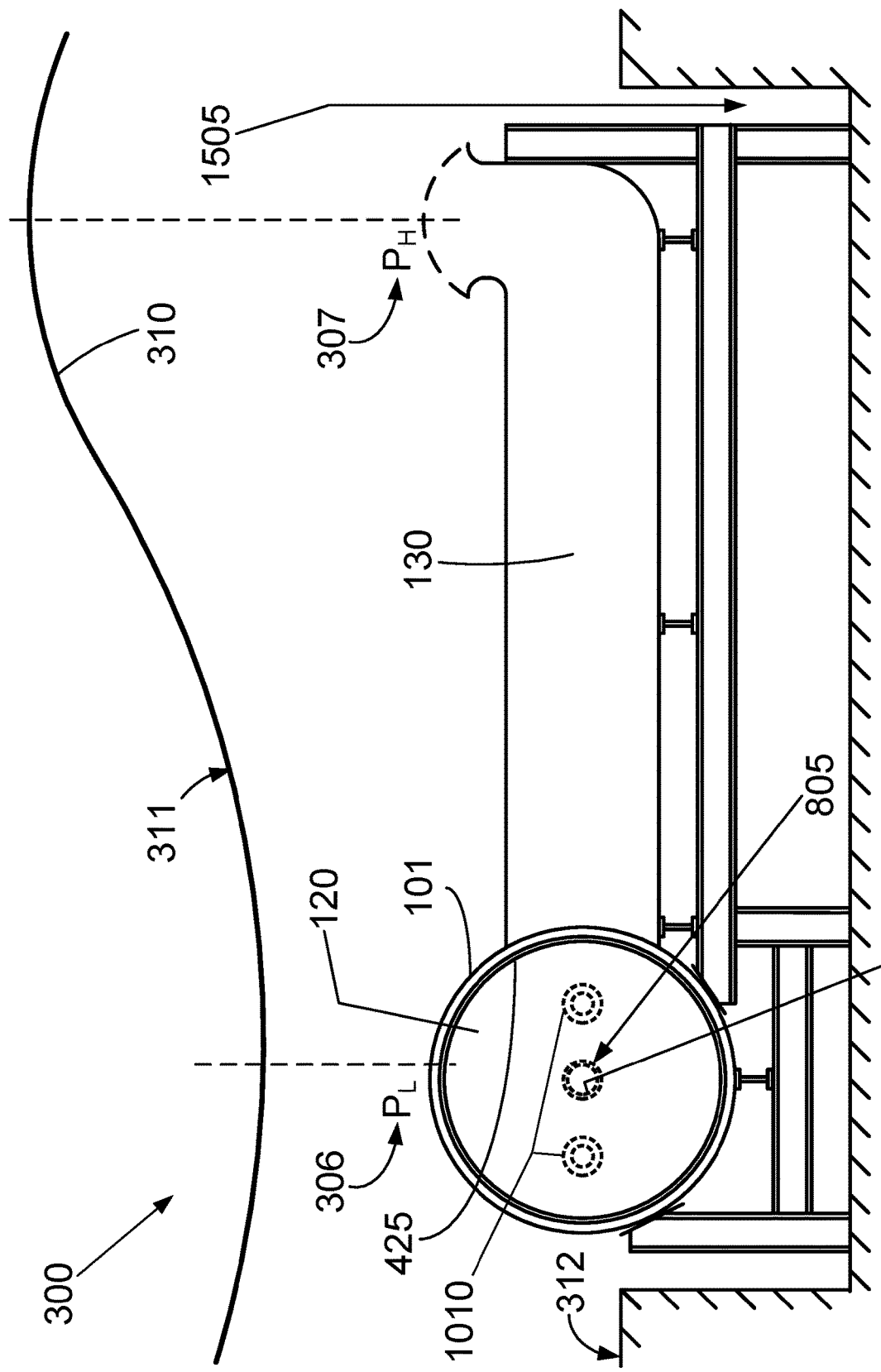
FIG. 15 is a side elevation view of a wave energy converter mounted within a depression on the seabed.

Alternate embodiments are illustrated in FIG. 2, FIG. 13 and FIG. 14. As in all embodiments, the wave energy converter (100) includes a pair of pistons (1005) that are operated on by action of a differential pressure (305) created by a wave (310) transiting above and over the wave energy converter (100). What varies is the housing for the pistons and the water ports, also referred to as apertures, where the water enters and leaves the wave energy converter (100). The point of higher pressure (307) moves with the crest of the wave and the point of lower pressure (306) moves with the trough of the wave. The transit of the differential pressure (305) over the wave energy converter (100) is best visualized by comparison of the point of lower pressure (306) and the point of higher pressure (307) as reflected by the position of the wave (310) as shown in FIG. 3 and FIG. 15.

As in all embodiments, the wave energy converter (100) is positioned below the surface of a body of water on a seabed (312). The wave energy converter (100) responds to the differential pressure (305) created in part by the changing weight of the water column above the wave energy converter (100) as the wave (310) transits over the wave energy converter (100). The differential pressure (305) is also influenced in part by dynamic forces from water flow.

The first preferred embodiment of the wave energy converter (100) shown in FIG. 1, as well as the second preferred embodiment (200) shown in FIG. 2, includes a vessel (101). The vessel (101) which is essentially a container that defines an inner volume. The vessel (101) defines at least one of the water receiving port (106). The water receiving port (106) in two locations is shown in FIG. 2.

The wave energy converter (100) works on the principle that openings at different points on the wave energy converter (100) are strategically positioned below a wave (310) to take advantage of the differential pressure (305) caused by the transit of a wave over the wave energy converter (100).

As in all embodiments, water will flow into the wave energy converter (100) when one or more open ports in the wave energy converter (100) are at a point of higher pressure (307) than one or more apertures at a point of lower pressure (306). In all embodiments, the pair of pistons (1005) is situated to move in opposite directions from each other as a result of the differential pressure (305). Preferably, the pistons are neutrally buoyant, which eliminates unwanted forces acting on the pistons and the bearing or sliding surfaces of the guide (236).

As in all of the embodiments, the water receiving port (106) is configured to permit a flow of water (210) into and out of the vessel (101). Typically, water flows into the vessel (101) when the water receiving port (106) is at a higher pressure than another port at a lower pressure. Thus, the downstream aperture (131) is positioned so that when a wave (310) transits over the vessel (101), the downstream aperture (131) is at a point of lower pressure (306) when the vessel (101) is at a point of higher pressure (307). The water ports experience cyclic high and low pressure depending on where the crest and trough are located at any given time. For all the embodiments, each water port, also referred to as an aperture, may be fitted with a grated cover (710) to prevent debris and large sea life from entering the water port.

As in all of the embodiments, the wave energy converter (100) includes a means for producing energy (215) positioned between the pair of pistons (1005). The means for producing energy (215) is any device that can extract energy from the moving pair of pistons (1005). For most embodiments, the means for producing energy (215) is either a hydraulic cylinder (420) or a linear alternator (1100).

Figure 4:
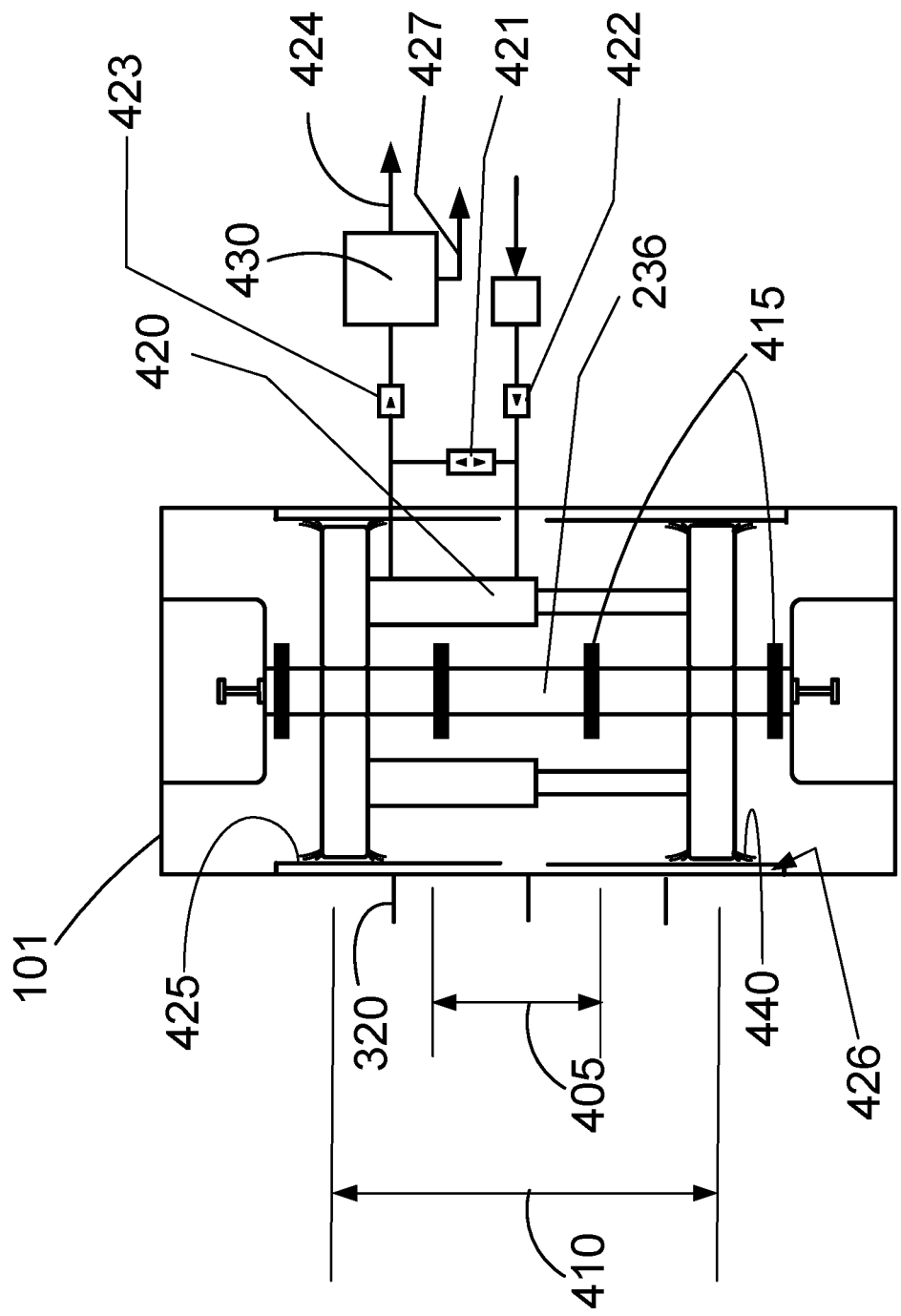
FIG. 4 is a plan view of the vessel showing the internal component parts of the vessel.
Figure 10:
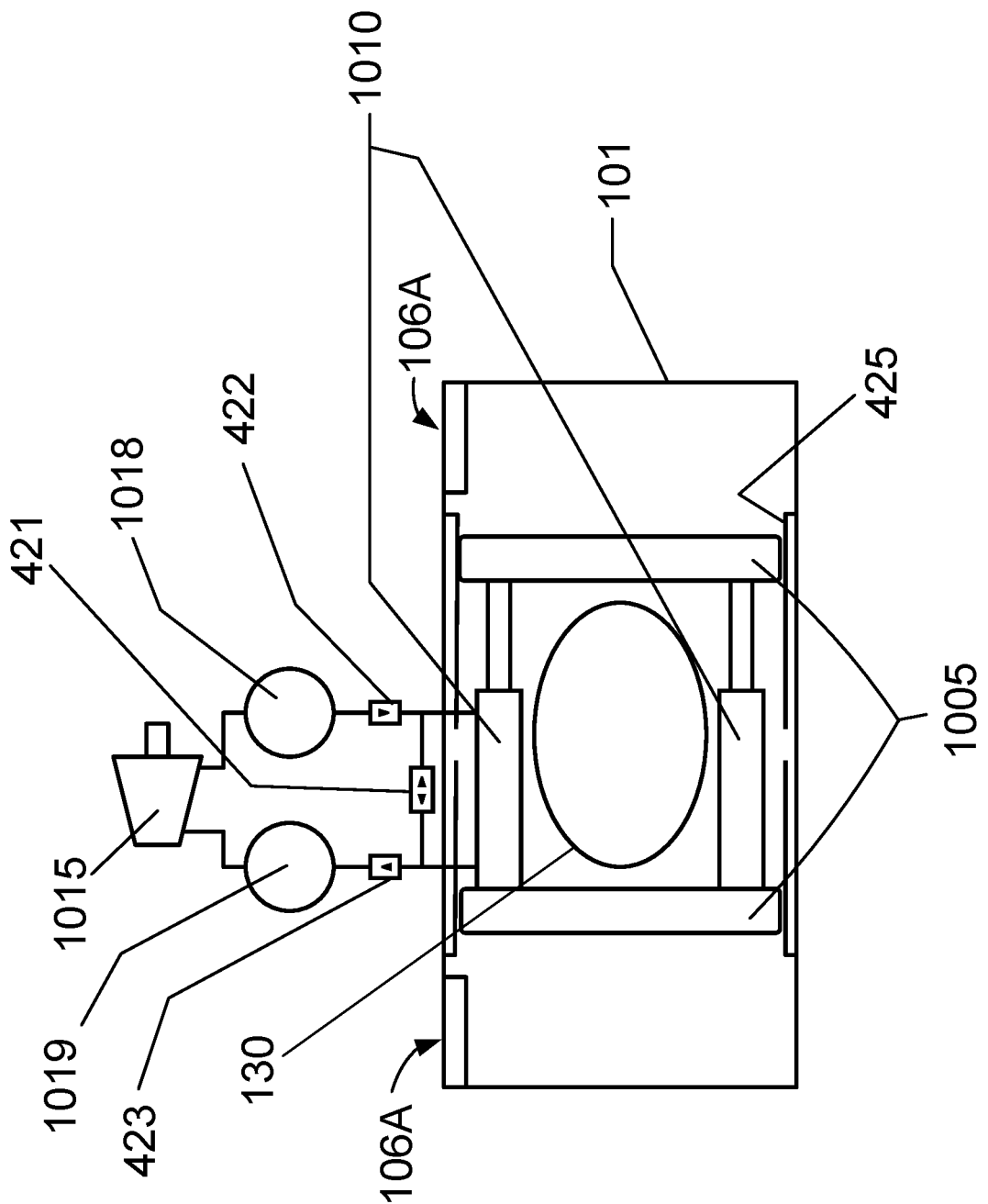
FIG. 10 is a front elevation view of the second preferred embodiment of the wave energy converter showing the inside of the vessel and the location of the water-conveyance pipe and illustrating a hydraulic motor connected to one of two hydraulic cylinders serving as the means for producing energy.

When the means for producing energy (215) is a hydraulic cylinder (420), then hydraulic fluid is pressurized, which can then be utilized for a myriad of purposes. A first example is to power a hydraulic motor (1015) as shown in FIG. 10. A high-pressure manifold (1019) and a low-pressure manifold (1018) are used to hook up more than one hydraulic cylinder (420). A second example is to power a desalination unit (430) to produce desalinated water (424) and brine for evaporation pond in salt production (427), as shown in FIG. 4. When the means for producing energy (215) is a linear alternator (1100), the electricity produced may be used directly to satisfy electric power needs.

The hydraulic cylinder (420) may be a single-acting hydraulic cylinder as is shown in FIG. 4. Preferably, the hydraulic cylinder (420) is a double-acting hydraulic cylinder. The double-acting hydraulic cylinder is best because it provides pressurized fluid when the hydraulic cylinder is compressed or when it is extended. Since the pair of pistons (1005) operate to compress or extend the hydraulic cylinder, then the double-acting hydraulic cylinder would be best for use in any of the embodiments of the wave energy converter (100).

The hydraulic cylinder (420) is a component well known in the art. The hydraulic cylinder (420) operates using a working fluid, which is typically oil, but may also be other fluids such as water glycol. The use of seawater directly as the hydraulic fluid, perhaps for desalination, is possible but has a disadvantage of higher potential for fouling/degradation of the hydraulic cylinder (420). Preferably, desalination would be done by extracting energy from a hydraulic motor using an oil for the working fluid. For all embodiments, the hydraulic cylinder (420), when used, converts the linear motion of the pair of pistons (1005) into potential energy stored in the working fluid.

When means for producing energy (215) is a hydraulic cylinder (420), then preferably, an equalization valve (421) is connected to the hydraulic cylinder (420). The equalization valve (421) provides a means to deactivate the hydraulic cylinder (420) and thereby prevent the hydraulic cylinder (420) from extracting energy from movement of the first piston (120) and the second piston (125) in response to the movement of the wave (310) over the wave energy converter (100). Deactivation may also be implemented to provide a uniform loading on the surfaces of the pair of pistons (1005) when multiple hydraulic cylinders are provided. Uniform loading helps to ensure integrity of the pair of pistons (1005) and smooth operation of the guide (236). Each equalization valve (421) is preferably a solenoid-controlled valve for remote operation. As shown in FIG. 4, other valves include a solenoid-controlled low-pressure one-way valve (422) and a solenoid-controlled high-pressure one-way valve (423).

Optionally, the means for producing energy (215) is a plurality of hydraulic cylinders (1010), wherein each hydraulic cylinder (420) in the plurality of hydraulic cylinders (1010) is configured to be activated or deactivated based on the forces acting on the pair of pistons (1005), that is, based on the differential pressure (305) acting on the pistons. Closing the equalization valve (421), the solenoid-controlled low-pressure one-way valve (422), and the solenoid-controlled high-pressure one-way valve (423) on all the hydraulic cylinders simultaneously would lock the pair of pistons (1005) in place. Because locking the pair of pistons (1005) in place would prevent movement of the pistons even when waves are active, the design pressure of the vessel (101) would optimally to be selected to survive such a condition.

When the means for producing energy (215) is a linear alternator (1100), electricity is directly produced by the wave energy converter (100). The linear alternator (1100) is essentially a linear motor used as an electrical generator. As used herein, the linear alternator (1100) is the equivalent of a linear generator, except that instead of converting electrical energy to mechanical energy, the linear alternator (1100) converts mechanical energy to electrical energy.

As is well known in the art, the linear alternator (1100) works by the principle of electromagnetic induction. While most alternators work with rotary motion, the linear alternator (1100) works with "linear" motion (i.e. motion in a straight line).

Figure 11:
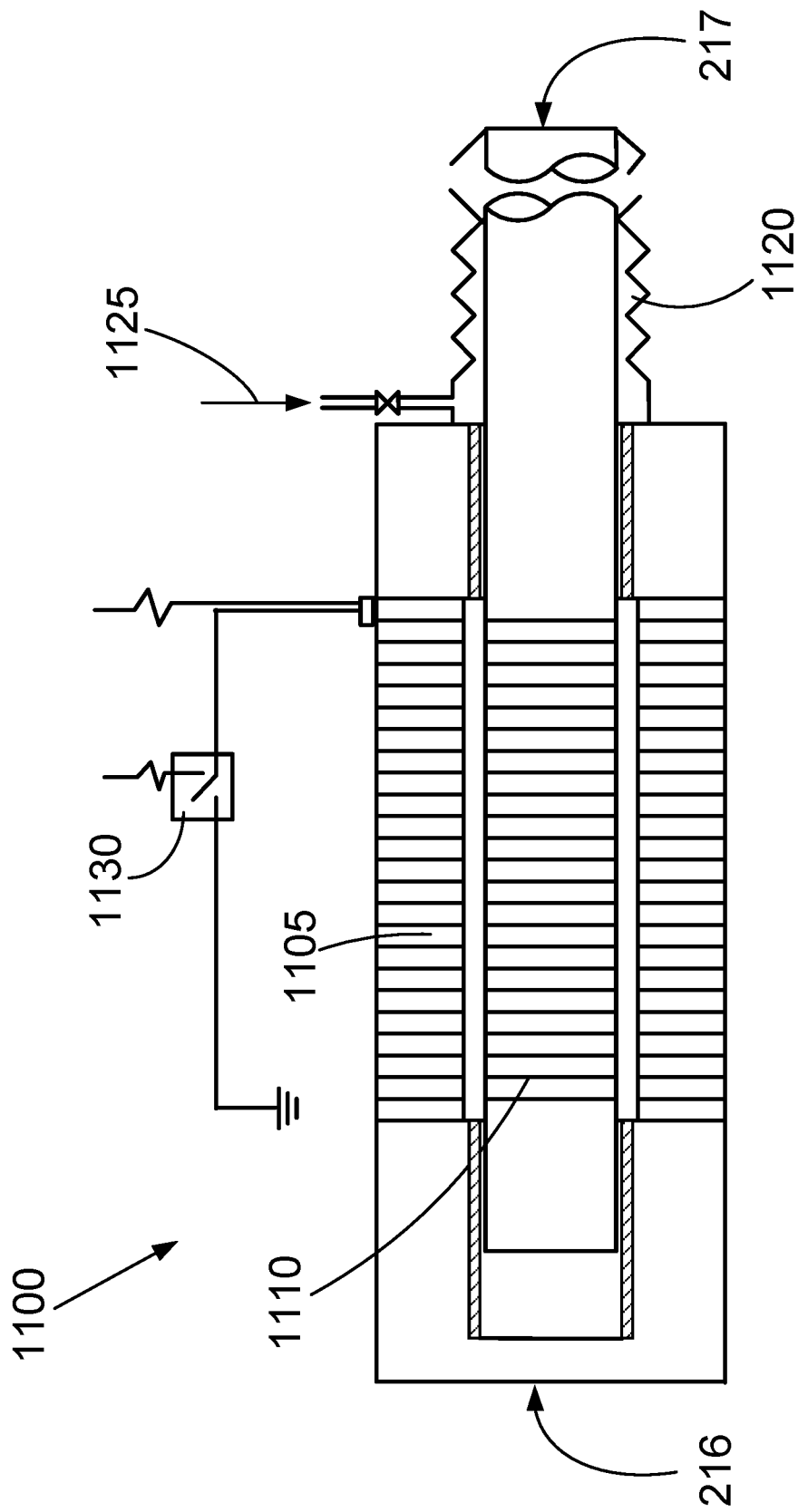
FIG. 11 is a side elevation view of a linear alternator serving as the means for producing energy.

As shown in FIG. 11, the linear alternator (1100) works by virtue of the relative movement of the laminated permanent magnets (1110) with respect to the stator windings (1105). Preferably, a flexible seal (1120) separates sea water from a cover gas (1125). The cover gas (1125) serves as an operating environment between the laminated permanent magnets (1110) and the stator windings (1105) in the linear alternator (1100). Preferably, the cover gas (1125) is nitrogen or air. A shunt (1130) is preferably used to short-circuit or enable zeroing-out electricity production and to minimize loading on pistons whenever desired.

When the means for producing energy (215) is a linear alternator (1100), then preferably, a shunt (1130) is included that may be engaged when no electrical current is desired from the linear alternator (1100). The shunt (1130) essentially adds an option to ground out any electricity produced by the linear alternator (1100).

In all of the embodiments of the wave energy converter (100), the means for producing energy (215) is configured to define a first-end (216) and a second-end (217). The first-end (216) is connected to the first piston (120) and the second-end (217) is connected to the second piston (125). This connection moves the pair of pistons (1005) in opposing or opposite directions within the vessel (101). As a result, the opposing motion of the pistons causes the means for producing energy (215) to repetitively produce a minimum dimension (405) and a maximum dimension (410), which are not fixed dimensions. During operation, the minimum dimension (405) and a maximum dimension (410) are variable as a result of operating conditions. The minimum dimension (405) and the maximum dimension (410) may be reached in response to wave action on the surface (311) over the wave energy converter (100), or may be dictated by stops (415) located to limit piston travel.

Opposing movement of the pistons in the pair of pistons (1005) caused by transit of the wave (310) above the wave energy converter (100), in turn pushes or pulls on the first-end (216) and the second-end (217) of the means for producing energy (215). This in turn causes reciprocal linear motion and creates the periodic expansion and compression of the means for producing energy (215).

In all the embodiments with a water-conveyance pipe (130), the water-conveyance pipe (130) is connected to the vessel (101) at a location that permits the flow of water into the vessel (101) when the downstream aperture is at a point of higher pressure (307) when water receiving port (106) on the vessel (101) is at a point of lower pressure (306).

For the embodiment of FIG. 1 where the water receiving port (106) is located between the first piston (120) and the second piston (125), the water-conveyance pipe (130) is situated so that water flows into the water-conveyance pipe (130) at locations beyond the extended dimension of the means for producing energy (215).

For the embodiment of FIG. 1, the water-conveyance pipe (130) is connected to the vessel (101) in a configuration that permits water to enter and exit the vessel (101) from the water-conveyance pipe (130) at locations on the vessel (101) that are not between the pair of pistons (1005), that is, the water-conveyance pipe (130) has at least two connections to the vessel (101) where these connections are separated by a distance (116) greater than the maximum dimension (410) of the means for producing energy (215); and wherein the water receiving port (106) for the vessel (101) is located between the pair of pistons (1005). For this embodiment, the water-conveyance pipe (130) may be thought of as two pipes, each connected on opposite ends of the vessel (101) beyond reach, or travel path, of the first piston (120) and the second piston (125).

Figure 7:
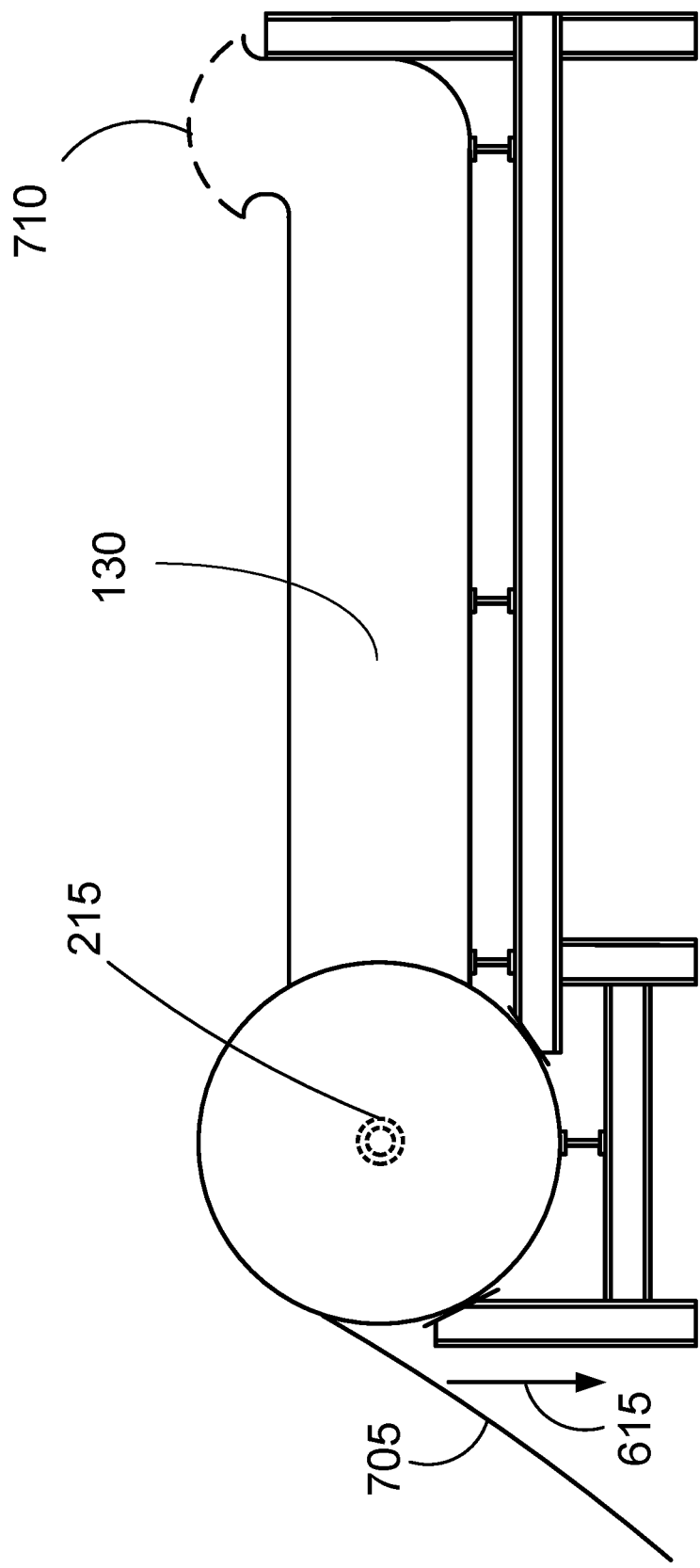
FIG. 7 is a side elevation view of the wave energy converter on a support structure for mounting on the seabed.
Figure 8:
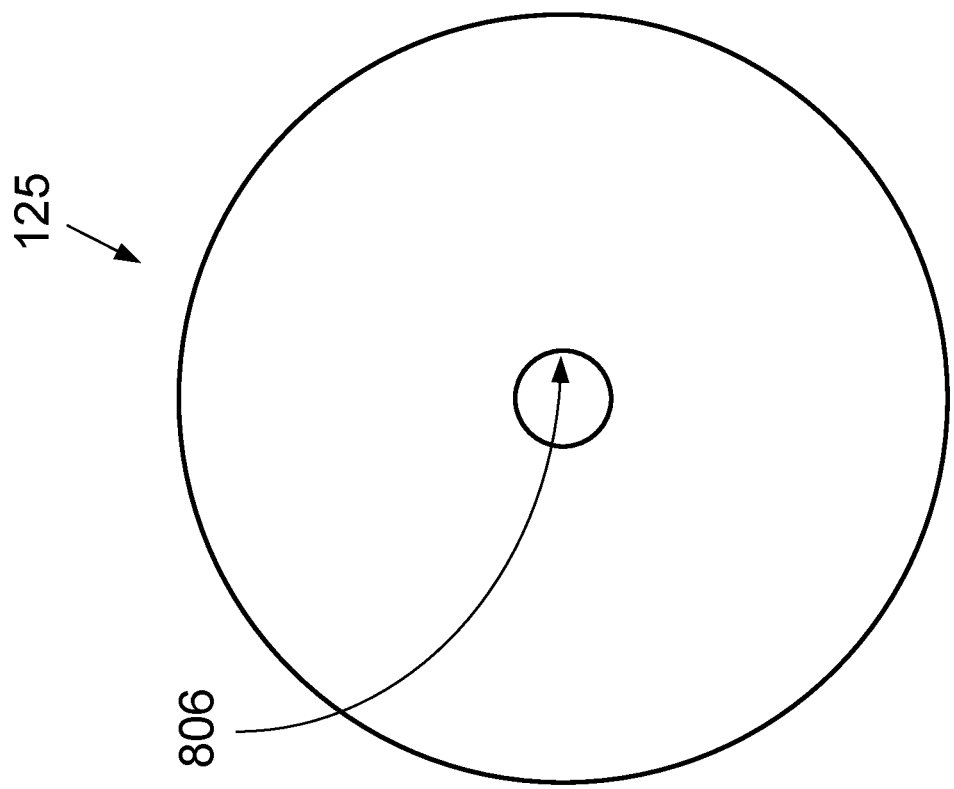
FIG. 8 is an end view of two pistons showing the sliding surface on each piston that would mount on a guide to constrain the movement of the pistons within the vessel.
Figure 8:
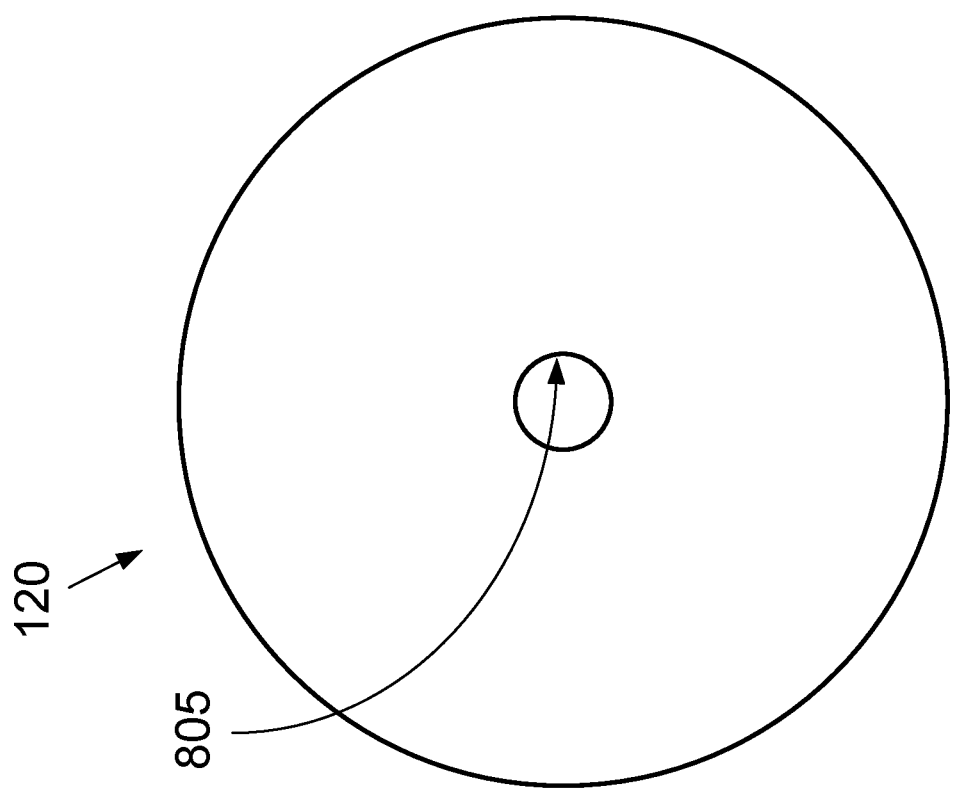

For the embodiments of FIG. 2, FIG. 7 and FIG. 15 (best seen in FIG. 2) where there are two of the water receiving port (106) located beyond the traveling dimensions of the first piston (120) and the second piston (125) within the vessel (101), the water-conveyance pipe (130) is located between the pair of pistons (1005).

Optionally, the minimum/maximum traveling dimensions of the first-end (216) and the second-end (217) of the means for producing energy (215) may be limited by one or more stops (415), shown in FIG. 4. The stops (415) may be added to prevent damage to the means for producing energy (215), as a means for limiting power output, or for other purposes. Preferably, the stops (415) are located on a guide (236) that constrains the movement of the pistons within the vessel. The stops (415) are configured to prevent movement of the first piston (120) and the second piston (125) beyond the stops (415).

The water-conveyance pipe (130) defines a downstream aperture (131) that is ideally located below a typical wave trough when the water receiving port (106) is located below the typical wave crest. This is illustrated in FIG. 2. These locations for the water ports enable the greatest differential pressure to act upon the pair of pistons (1005).

The water-conveyance pipe (130) is configured to enable the flow of water (210) into and out of the water-conveyance pipe (130). The downstream aperture (131) is preferably positioned so that the downstream aperture (131) is at a point of lower pressure (306) when the vessel (101) is at a point of higher pressure (307). Thus, the downstream aperture (131) is positioned so that when a wave (310) transits over the vessel (101), the downstream aperture (131) is at a point of lower pressure (306) when the vessel (101) is at a point of higher pressure (307).

The pair of pistons (1005) includes a first piston (120) and a second piston (125). The first piston (120) is connected to the first-end (216) of the means for producing energy (215). While the second piston (125) is connected to the second-end (217) of the means for producing energy (215).

The first piston (120) is configured to move within the vessel (101) in a direction opposite to the movement of the second piston (125). The motive force for opposing motions of the pistons is primarily the differential pressure (305) acting on each piston. A small pressure drop within the water-conveyance pipe diminishes the motive force from the differential pressure (305). The differential pressure (305) on each piston is created by the wave (310) passing over the wave energy converter (100) and by the locations of the water receiving port (106) and the downstream aperture (131).

A second preferred embodiment (200) of the wave energy converter is shown in FIG. 2. In this second preferred embodiment (200), the vessel (101) defines the water receiving port (106) at two locations and the water-conveyance pipe (130) is located between the pair of pistons (1005), namely between the first piston (120) and the second piston (125).

The wave energy converter (100) optionally includes a guide (236) to constrain piston movements within the vessel (101). The guide (236) is preferably secured within the vessel (101) between the minimum dimension (405) and the maximum dimension (410) of the means for producing energy (215), which is the extent of the piston movements. The guide (236) is preferably mated to a sliding surface on the pistons. Accordingly, the first piston (120) defines a first sliding surface (805) that is configured to move along the guide (236) within the vessel (101). This is preferably a center hole which slides along a centrally located guide (236). Similarly, the second piston (125) defines a second sliding surface (806) also configured to move along the guide (236) within the vessel (101). The guides and mating sliding surfaces may be located anywhere, such as along the edge of the pistons if desired.

Figure 9:
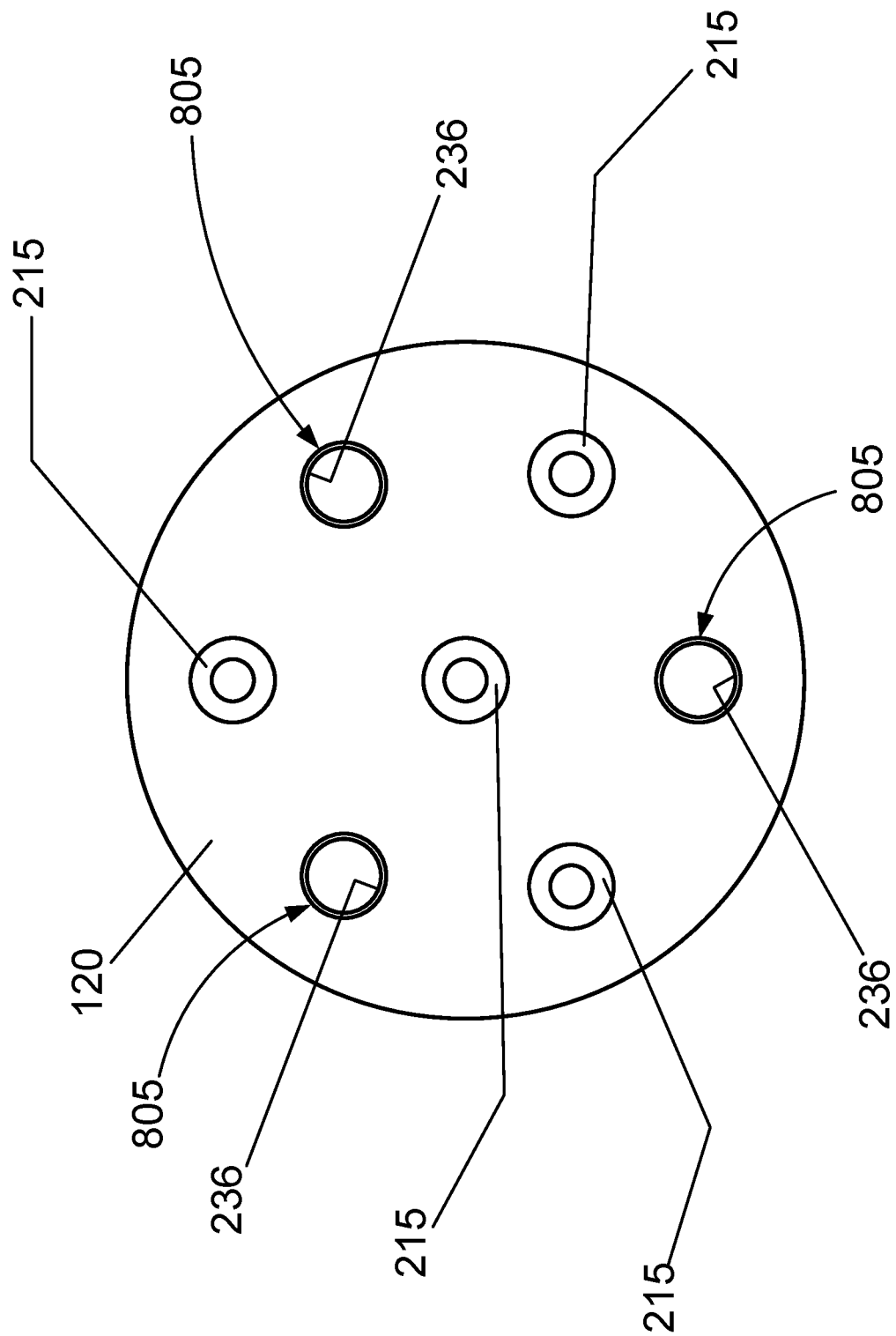
FIG. 9 is an end view of one of the pistons showing distributed locations for multiple guides and in the context of four means for producing energy.

There may be multiple guides used, as is shown in FIG. 9. FIG. 9 is an end view of one of the first piston (120) showing distributed locations for multiple guides essentially at 120 degree locations, and multiple means for producing energy (215). For example, if the means for producing energy (215) were a hydraulic cylinder (420), then each of the four hydraulic cylinders could be independently deactivated depending on the magnitude of the differential pressure (305). For example, when wave load is low, the central hydraulic cylinder is active. When load is medium to high, three outer hydraulic cylinders are active. When load is very high, all four hydraulic cylinders would be active. Such an arrangement allows maintenance of a nearly fixed hydraulic pressure within the high-pressure manifold (1019).

Figure 12:
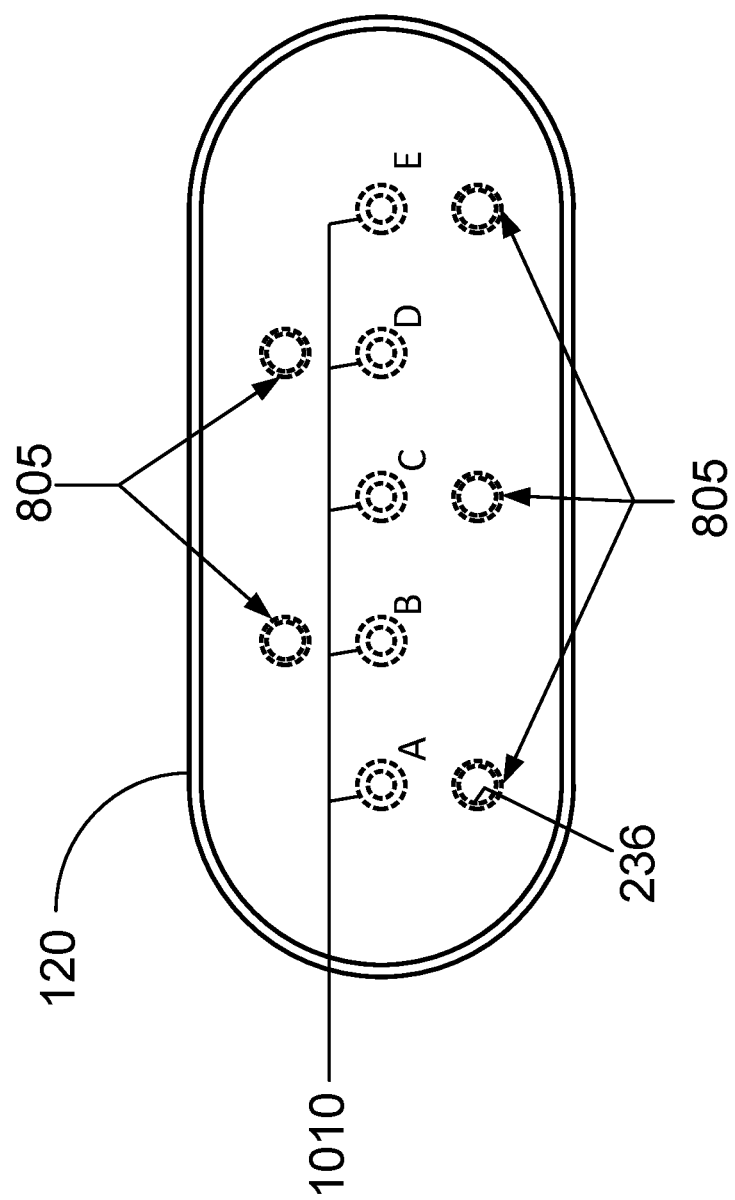
FIG. 12 is a plan view of a non-circular piston showing five guide locations and five linear locations for the means for producing energy, which can be controlled to turn on and off depending on the wave force acting on the piston.

Similarly, FIG. 12 illustrates another example where a plurality of hydraulic cylinders (1010) is used with an oblong piston shape and multiple guides. This particular piston shape may be employed to increase output from device, and/or to lower the profile of the wave energy converter (100) if needed for shallow seas.

Each hydraulic cylinder in the plurality of hydraulic cylinders (1010) would be activated or deactivated, preferably based on table and preferably using solenoid-controlled valves. An exemplary table is

| Preferable Load Level on Piston (e.g., Wave Height) vs. Activated Hydraulic Cylinder | |
| --- | --- |
| Load Level | Activated Cylinder(s) (FIG. 12) |
| 20% | C |
| 40% | B + D OR A + E |
| 60% | A + C + E |
| 80% | A + B + D + E |
| 100% | ALL |

The wave energy converter (100) optionally includes a vessel ramp (705) added to the vessel (101) to create a downward force vector (615) arising from the flow of water (210) toward the downstream aperture (131) of the water-conveyance pipe (130). The vessel ramp (705) helps to resist movement of an unsecured installation on the seabed (312). The vessel ramp helps to decrease current-induced drag forces on the vessel. The vessel may be reinforced with a rib (320) as shown in FIG. 3. One or more ribs may be added to the vessel (101) as shown in FIG. 4, or to the water-conveyance pipe (130) to improve structural stability.

Similarly, the wave energy converter (100) optionally includes a pipe ramp (605) added to the water-conveyance pipe (130) to create a downward force vector (615) arising from the flow of water (210) over the water-conveyance pipe (130) and to blend-in to the terrain of the seabed. Cross-currents immediately above the seabed (312) can create sideways forces acting on the wave energy converter (100) and this downward force vector (615) can help to resist sideways movement of an unsecured emplacement on the seabed (312). Of course, where convenient, the wave energy converter (100) may be secured to the seabed (312). The downward force vector (615) may also be created by shaping the water-conveyance pipe (130) in the form of a ramp, as shown in FIG. 5. This form can be made by pressing the pipe down and utilizing supports (505) to ensure asymmetry around horizontal center line. For ease of manufacture, this ramp-shaped cross-section may be attained using fiberglass or concrete.

The wave energy converter (100) optionally includes an inner wall (425) within the vessel (101). The inner wall (425) creates space between the pair of pistons (1005) and the vessel wall. This space helps to isolate the pair of pistons (1005) and their travel path from being affected by dents or other damage to the wall of the vessel (101). The inner wall (425) is configured to enclose the first piston (120) and the second piston (125). The inner wall (425) is further configured to define an interstitial space (426) between the vessel (101) and the inner wall (425). Finally, the inner wall (425) is further configured to define at least one pressure-equalization hole (240) through the inner wall, so that the pressure within the interstitial space (426) is the same as that on the inside of the inner vessel wall. In addition, the pair of pistons (1005) may include an edge-brush (440) installed around the edge of the first piston (120) and preferably also around the second piston (125) so as to keep sand away from sliding surfaces and to minimize seepage of water through the gap between a piston and the inner wall (425). Optionally, the edge-brush (440) may be placed at the edge of both sides of each piston in the pair of pistons (1005).

A third preferred embodiment (1300) of the wave energy converter is shown in FIG. 13. In the third preferred embodiment (1300), the wave energy converter (100) optionally includes a second water-conveyance pipe (1305) connected to the vessel (101) in a configuration that extends the second water-conveyance pipe (1305) in an upstream direction (1310). In order to do so, the second water-conveyance pipe (1305) defines an upstream aperture (1306). The upstream aperture (1306) enables the flow of water (210) into and out of the second water-conveyance pipe (1305) when it is positioned so that when the wave (310) transits over the wave energy converter (100), the upstream aperture (1306) is at a second point of lower pressure (1307) when the vessel (101) is at a point of higher pressure (307).

The fourth preferred embodiment (1400) is a simplified variation that is based on unifying the vessel (101) and the water-conveyance pipe (130) into a pipe (1405). Preferably, the pipe (1405) has streamlined end pieces to reduce drag forces from currents at the seabed (312).

As with the other embodiments, the fourth preferred embodiment (1400) includes a pair of pistons (1005). The pair of pistons (1005) is located within the pipe (1405), more or less centrally from a lengthwise perspective. The pipe (1405) is similarly configured to house a pair of pistons (1005) to extract energy from a wave (310) transiting on a surface (311) of a body of water. Water enters the pipe (1405) at the water receiving port (106) located between the pair of pistons (1005).

As with the other embodiments, the fourth preferred embodiment (1400) is located on a seabed (312) and thus, the pipe (1405) is preferably supported adjacent to the seabed (312). As with the fourth preferred embodiment, the pipe (1405) defines the upstream aperture (1306), the downstream aperture (131) and the water receiving port (106), which may conceptually be considered a mid-stream aperture.

As with the other embodiments, the pair of pistons (1005) includes a first piston (120) and a second piston (125). In this fourth preferred embodiment (1400), the pair of pistons (1005) is located within the pipe (1405) straddling the water receiving port (106).

As with the other embodiments, the means for producing energy (215) is positioned, i.e. attached, between the pair of pistons (1005). Similarly, the means for producing energy (215) is configured to define a first-end (216) and a second-end (217). The first-end (216) of the means for producing energy (215) is connected to the first piston (120) and the second-end (217) of the means for producing energy (215) connected to the second piston (125). The first piston (120) and the second piston (125) are configured to slide in opposite directions within the pipe (1405) in response to the differential pressure acting on the pair of pistons (1005) by the wave (310) passing over the fourth preferred embodiment (1400) of the wave energy converter.

Any of the embodiments may be positioned within a trench, a pit or a depression in the seabed. FIG. 15 is a side elevation view of a wave energy converter (100) mounted within a depression (1505) on the seabed. This placement is beneficial for siting the wave energy converter (100) in shallow seas. This placement also helps to reduce drag forces on the wave energy converter (100).

The above-described embodiments including the drawings are examples of the invention and merely provide illustrations of the wave energy converter. Other embodiments will be obvious to those skilled in the art. Thus, the scope of the invention is determined by the appended claims and their legal equivalents rather than by the examples given.

INDUSTRIAL APPLICABILITY

The invention has application to the energy industry.

What is claimed is:

1. A wave energy converter comprising a pair of pistons configured to use a differential pressure to extract energy from a wave transiting on a surface of a body of water, the wave passing above the wave energy converter positioned below the surface on a seabed, the wave energy converter further comprising:
   a vessel defining a water receiving port, the water receiving port configured to permit a flow of water into and out of the vessel such that the flow of water pushes each piston in the pair of pistons in opposite directions;
   a means for producing energy positioned between the pair of pistons, the means for producing energy configured to define a first-end and a second-end that are configured to move in opposite directions within the vessel so as to produce a minimum dimension and a maximum dimension of the means for producing energy;
   a water-conveyance pipe connected to the vessel:
      the water-conveyance pipe defining a downstream aperture configured to enable flow of water into and out of the water-conveyance pipe, the downstream aperture positioned so that the downstream aperture is at a point of lower pressure when the vessel is at a point of higher pressure; and the water-conveyance pipe connected to the vessel at a location that permits the flow of water into the vessel when the downstream aperture is at a point of higher pressure when water receiving port on the vessel is at a point of lower pressure;

the pair of pistons comprising a first piston connected to the first-end of the means for producing energy, the first piston configured to move within the vessel in response to the differential pressure created by the wave passing over the wave energy converter; and the pair of pistons further comprising a second piston connected to the second-end of the means for producing energy, the second piston configured to move within the vessel in a direction opposite to that of the first piston in response to the differential pressure created by the wave passing over the wave energy converter.

2. The wave energy converter of claim 1, wherein the vessel defines two water receiving ports; and wherein the water-conveyance pipe is located between the pair of pistons.

3. The wave energy converter of claim 1, wherein the water-conveyance pipe is connected to the vessel in a configuration that permits water to enter and exit the vessel from the water-conveyance pipe at locations on the vessel that are separated by a distance greater than the maximum dimension of the means for producing energy; and wherein the water receiving port is located between the pair of pistons.

4. The wave energy converter of claim 1, further comprising:
a guide secured within the vessel between the minimum dimension and the maximum dimension of the means for producing energy;
the first piston defining a first sliding surface configured to move along the guide within the vessel; and
the second piston defining a second sliding surface configured to move along the guide within the vessel.

5. The wave energy converter of claim 4, further comprising stops on the guide configured to prevent movement of the first piston and the second piston beyond the stops.

6. The wave energy converter of claim 1, wherein the pistons are neutrally buoyant.

7. The wave energy converter of claim 1, wherein the means for producing energy is a hydraulic cylinder.

8. The wave energy converter of claim 7, further comprising an equalization valve connected to the hydraulic cylinder, the equalization valve configured to deactivate the hydraulic cylinder and thereby prevent the hydraulic cylinder from extracting energy from movement of the first piston and the second piston in response to the wave.

9. The wave energy converter of claim 1, wherein the means for producing energy is a plurality of hydraulic cylinders, wherein each hydraulic cylinder in the plurality of hydraulic cylinders is configured to be activated or deactivated based on the differential pressure acting on the pistons.

10. The wave energy converter of claim 1, wherein the means for producing energy is a linear alternator.

11. The wave energy converter of claim 10, further comprising a shunt configured to be engaged when no electrical current is desired from the linear alternator.

12. The wave energy converter of claim 1, further comprising a vessel ramp added to the vessel to configure the vessel to create a downward force vector arising from the flow of water toward the downstream aperture of the water-conveyance pipe.

13. The wave energy converter of claim 1, further comprising a pipe ramp added to the water-conveyance pipe to configure the water-conveyance pipe to create a downward force vector arising from the flow of water over the water-conveyance pipe.

14. The wave energy converter of claim 1, further comprising an inner wall within the vessel, the inner wall configured to enclose the first piston and the second piston, the inner wall further configured to define an interstitial space between the vessel and the inner wall and further configured to define at least one pressure-equalization hole through the inner wall.

15. The wave energy converter of claim 1, further comprising a second water-conveyance pipe connected to the vessel in a configuration that extends the second water-conveyance pipe in an upstream direction, the second water-conveyance pipe defining an upstream aperture configured to enable flow of water into and out of the second water-conveyance pipe, the upstream aperture positioned so that when the wave transits over the wave energy converter, the upstream aperture is at a second point of lower pressure when the vessel is at a point of higher pressure.

16. The wave energy converter of claim 1, further comprising an edge-brush installed around the edge of the first piston.

17. A wave energy converter comprising a pair of pistons configured to use a differential pressure to extract energy from a wave transiting on a surface of a body of water, the wave passing above the wave energy converter positioned below the surface on a seabed, the wave energy converter further comprising:
a pipe configured to be supported adjacent to the seabed, the pipe defining an upstream aperture, a downstream aperture and a water receiving port;
the pair of pistons comprising a first piston and a second piston, the pair of pistons located within the pipe straddling the water receiving port;
a means for producing energy positioned between the pair of pistons, the means for producing energy configured to define a first-end and a second-end;
the first-end of the means for producing energy connected to the first piston;
the second-end of the means for producing energy connected to the second piston; and
the first piston and the second piston configured to slide in opposite directions within the pipe in response to the differential pressure acting on the pair of pistons by the wave passing over the wave energy converter.

* * * * *